INVENTOR
ANTOINE SALVI
BY
ATTORNEY

United States Patent Office 3,495,163
Patented Feb. 10, 1970

3,495,163
NUCLEAR MAGNETIC RESONANCE MAGNETOMETERS INCLUDING ELECTRONIC RESONANCE ENHANCEMENT
Antoine Salvi, Fontaine, France, assignor to Commissariat a l'Energie Atomique, Paris, France
Filed Mar. 8, 1968, Ser. No. 711,556
Claims priority, application France, Mar. 7, 1967, 98,064; Feb. 7, 1968, 138,924
Int. Cl. H01s 1/00
U.S. Cl. 324—.5      2 Claims

ABSTRACT OF THE DISCLOSURE

Two-sample nuclear resonance magnetometers are disclosed which utilize a pair of solutions having electronic and nuclear resonance absorption lines. This pair of solutions is formed by triacetoneamine nitroxide in two different solutions, these two triacetoneamine solutions having a common electronic resonance line. Saturation of this common electronic resonance line produces in one of the solutions an absorption of energy and in the other solution a stimulated emission of energy, at the common nuclear resonance frequency of the solutions. Preferably the first solvent is pure dimethoxyethane and the second solvent is pure methanol.

---

Figure 1:
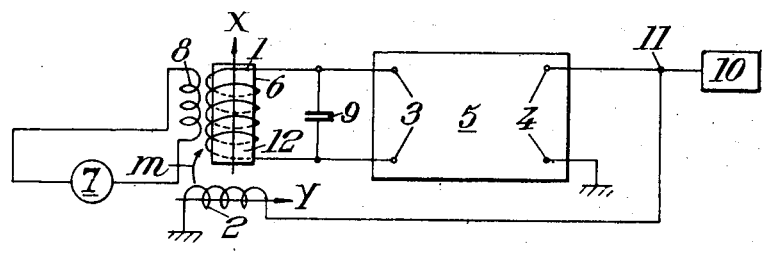

The present invention relates to improvements in pairs of solutions having gyromagnetic properties, usable in electronic and nuclear resonance magnetometry, in particular in electronic and nuclear magnetic resonance magnetometers of the type described in United States patent application Ser. No. 543,113 filed by the present applicant on Apr. 18, 1966, now Patent No. 3,441,838, in particular of the type illustrated in FIGURE 3 of that patent, that is to say comprising, in combination:

A first and a second container disposed side by side and each containing one solution of a pair of solutions having gyromagnetic properties, each comprising a paramagnetic substance, having at least one electronic resonance line saturable by high frequency radiation, dissolved in a solvent having a nuclear resonance frequency, the pair of solutions being such that a common high frequency excites two inverse electronic lines, that is to say that the saturation of the resonance line of the paramagnetic substance of the first solution causes (due to the coupling between electronic spins and nuclear spins in this solution) an increase of absorption of energy at the nuclear resonance frequency of this solution, whereas the saturation of the electronic resonance line of the second solution causes (due to the coupling between electronic spins and nuclear spins of this second solution) a stimulated emission of energy at the nuclear resonance frequency of this second solution, which is, besides, the same as the nuclear resonance frequency of the first solution;

Means for saturating the common electronic resonance line of the two solutions in the two containers;

A linear amplifier;

Two pairs of coils parallel with one other, the first pair being coupled to the first solution and the second pair to the second solution, with the first coil of the first pair and the first coil of the second pair connected to the input of said linear amplifier, whereas the second coil of the first pair and the second coil of the second pair are connected to the output of said amplifier; and A frequency meter connected to the output of the amplifier to measure the output frequency of the amplifier which is proportional to the intensity of the magnetic field in which the two containers are placed.

In the patent mentioned above, two examples of pairs of solutions are given, namely:

(a) A first pair comprising a first solution of ditertio-butyl-nitroxide (called hereafter in abbreviation DTBN) dissolved in a solvent constituted (by volume) half by water and half by acetone, and a second solution of tri-acetoneamine nitroxide (called hereafter in abbreviation TANO) dissolved in a solvent constituted by seven parts of water and three parts of ethylene glycol, the common electronic resonance line being 68.5 megacycles/second.

(b) A second pair comprising a first solution of TANO and a second solution of TANOXIME or tetramethyl 2,2,6,6 azo 1 cyclohexanoneoxime 4 oxide 1.

These two pairs of solutions comprising two different paramagnetic substances gave good results, but nevertheless had a certain number of disadvantages, namely the following:

Tanoxime does not have a very high factor of polarization, and accordingly the amplitude of the line of tanoxime is much weaker than the amplitude of the corresponding line of TANO, which does not permit good compensation of the emission and the absorption of energy when the second pair of solutions mentioned above is used;

DTBN is only stable in the very pure state, although it is very difficult to obtain in this state (in practice, one was obliged to replace the solution of DTBN often, since this solution altered); moreover the solutions of the first pair mentioned above were strongly aqueous solutions which had a freezing point slightly lower than 0° C., which led to a risk of freezing in the course of storage.

The applicant has now discovered that TANO, which does not have the disadvantages of TANOXIME and of DTBN (notably due to the fact that it can be obtained in the pure state and that it has very good stability in this state), permitted two solutions to be prepared having, for a common high frequency, a common resonance line having inverse effects in the two solutions, that is to say producing, during its saturation, an absorption of energy at the nuclear frequency of the solvent in one of the solutions and an emission of energy at the nuclear frequency of the solvent of the other solution.

Indeed, the applicant has discovered with surprise that, for a solution of TANO, the electronic resonance frequency corresponding to the non paired electron of the TANO was modified in non negligible proportions as a function of the solvent used.

This property has permitted the compositions of two half-samples to be adjusted in a manner such that, when a VHF field having a frequency of 62.65 megacycles/second is applied to them, the two opposed electronic resonance lines are saturated.

The present invention thus relates to a pair of solutions having gyromagnetic properties, usable in electronic and nuclear resonance magnetometry, characterized by the fact that this pair comprises triacetoneamine nitroxide in two different solutions, the two solutions of triacetoneamine having a common electronic resonance line, the saturation of this common electronic resonance line producing in one of the solutions an absorption of energy and in the other solution a stimulated emission of energy, at the common nuclear resonance frequency of the solutions, By way of non-limiting example:

The solvent of one of the solutions is dimethoxyethane (in abbreviation DME) whereas the solvent of the other solution is a mixture, by volume, of about 73% DME and about 27% water;

The solvent of one of the solutions is a mixture, by volume, of about 73% DME and about 27% water, whereas the solvent of the other solution is a mixture, by volume, of about 88% methanol and about 12% water;

The solvent of one of the solutions is pure DME and the solvent of the other solution is pure methanol; the preferred concentration of TANO in each of these solvents is of the order of the millimolecular concentration.

The invention also relates to a magnetometer of the type mentioned above using a pair of solutions also of the type mentioned above.

The invention will be easily understood with the aid of the following complementary description, together with the accompanying drawings, which complementary description and drawings are, of course, merely given by way of example.

Figure 2:
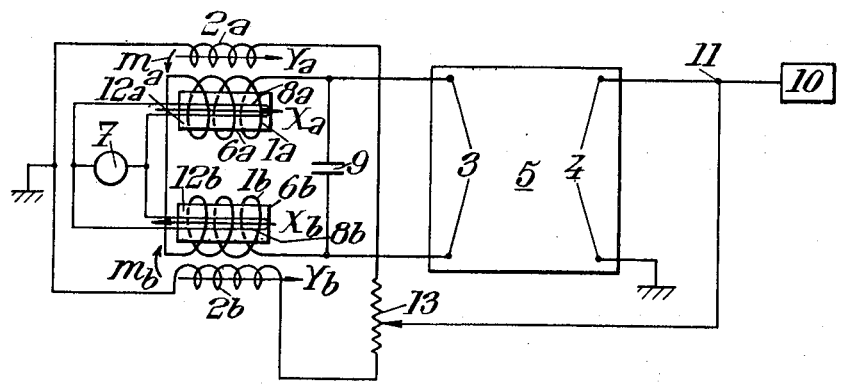

In these drawings:

FIGURE 1 illustrates schematically a simple magnetometer of the spin coupling oscillator type permitting the explanation of the structure and the operation of magnetometers according to the invention and the role of pairs of solutions having gyromagnetic properties according to the invention, whereas FIGURE 2 illustrates a magnetomer provided with the improvements according to the invention and using such a pair of solutions.

Referring first of all to FIGURE 1, it is recalled that a spin coupling oscillator comprises essentially two Bloch coils 1 and 2 which are connected respectively to the input 3 and the output 4 of a linear amplifier 5; the coils 1 and 2 are electromagnetically decoupled as much as possible, the directions X, Y of their axes being perpendicular to each other.

The coils 1 and 2 are wound around a container 6 containing a liquid sample 12 comprising, on the one hand, a solvent comprising atomic nuclei (in particular protons) having a magnetic moment and an angular momentum which are not zero, that is to say having a gyromagnetic ratio $\gamma$, the resonance frequency $f$ of these atomic nuclei in a magnetic field of intensity H being given by the formula $f=\gamma H/2\pi$, and on the other hand, a paramagnetic substance dissolved in this solvent, this substance comprising in its molecule an unpaired electron in interaction with an atomic nucleus of this substance which has a saturable electronic resonance line of non-zero frequency in a zero magnetic field.

The magnetometer also comprises means for saturating this electronic resonance line comprising a VHF oscillator or generator 7 for generating the frequency of this line and a coil 8 supplied by this generator and immersed in the liquid sample 12 at the interior of the container 6 (to facilitate the reading of FIGURE 1, the coils 2 and 8 have been shown separated from the container 6).

An electromagnetic screen (not shown) is provided between the coil 8 immersed in the container 6, on the one hand, and the coils 1 and 2 surrounding the container 6, on the other hand, this screen being transparent to the nuclear resonance frequency and opaque to the electronic resonance frequency.

Moreover, a capacitor 9 is disposed at the terminals of the coil 1 to form with that coil a resonant circuit tuned to the nuclear resonance frequency $f$ and having a low Q (of the order of 5) to reduce the pulling that would be produced if the Q were very high.

Finally, a frequency meter 10 is disposed at the output 4 of the amplifier 5 to measure the frequency of the nuclear resonance or Larmor frequency $f$; this frequency meter can be graduated directly in magnetic field intensities, for $H=2\pi f/\gamma$.

During operation, the saturation of the electronic resonance line generates a population inversion of the nuclear spins in the sample of the container 6, which leads to a stimulated emission of energy at the nuclear resonance frequency by the nuclear spins returning to the lower level. This stimulated emission produces a moment rotating at the nuclear resonance frequency (about 2100 cycles/second for a proton in the terrestrial magnetic field), which ensures a considerable coupling $m$ between the coils 1 and 2 (normally decoupled), but at this frequency. Thus a feed back oscillator is obtained in which the relatively pointed nuclear resonance curve (for the nuclear resonance lines are narrow) plays the same role as the resonance curve of an oscillating circuit in a conventional feed back oscillator; the condition for coupling, and hence for effective operation, is that the amplification of the amplifier 5 must exceed a determined threshold calculable for each spin coupling oscillator (it is also necessary to take into account that a part of the energy of the oscillator is tapped at 11 to be transmitted to the frequency meter 10).

Having thus explained the structure and the operation of spin coupling magnetometers with a single solution having gyromagnetic properties, a spin coupling magnetometer will now be described with reference to FIGURE 2, using a pair of solutions having gyromagnetic properties putting the present invention into practice.

The magnetometer of FIGURE 2 comprises first of all a first and a second container 6a and 6b containing the pair of solutions 12a and 12b having gyromagnetic properties according to the invention:

In a first embodiment, the container 6a contains a solution 12a comprising a millimolecular solution of TANO in pure DME, whereas the second container 6b contains a second solution 12b comprising a millimolecular solution of TANO in a mixture, by volume, of 73% DME and 27% water;

In a second embodiment, the solution 12a is a millimolecular solution of TANO in a mixture, by volume, of 73% DME and 27% water, whereas the second solution 12b comprises a millimolecular solution of TANO in a mixture, by volume, of 88% methanol and 12% water;

In a third embodiment, which, besides, is the preferred embodiment, the solution 12a is a millimolecular solution of TANO in pure DME and the second solution 12b is a millimolecular solution of TANO in pure methanol.

The common electronic resonance line for the two samples of these pairs is of the order of 62.65 megacycles/second, whereas the nuclear resonance frequency in the terrestrial magnetic field is that of hydrogen, namely about 2100 cycles/second.

In combination with these two containers, the magnetometer of FIGURE 2 comprises:

An oscillator 7 delivering an E.M.F. at the very high frequency of the electronic resonance line of the two solutions 12a and 12b, namely at the frequency 62.65 megacycles/second in the embodiments mentioned above;

Two coils 8a and 8b (having two turns for example) supplied in parallel by the oscillator 7 and immersed in the solutions 12a and 12b respectively to saturate, for each of these solutions, the electronic resonance line at 62.65 megacycles/second;

A linear amplifier 5;

Two pairs of coils 1a–2a and 1b–2b parallel with one other, the first pair 1a–2a being coupled to the first solution 12a and the second pair to the second solution 12b, with the first coil 1a of the first pair connected in series with the first coil 1b of the second pair to the input terminals 3 of the linear amplifier 5, whereas the second coil 2a of the first pair and the second coil 2b of the second pair are connected in parallel to the output 4 of the amplifier; in particular, the two coils 2a and 2b in parallel are connected between one of the output terminals of the amplifier and ground through an equilibrium potentiometer 13, the other output terminal of the amplifier being grounded;

A frequency meter 10 connected at 11 to the non grounded output terminal of the amplifier, to measure the frequency of the output voltage of this amplifier, which frequency is proportional to the magnetic field in which the two containers 1a and 1b are placed side by side;

And a capacitor 9 forming, with the coils 1a and 1b a circuit resonant at the nuclear resonance frequency.

The operation of the magnetometer with a pair of solutions having gyromagnetic properties, according to the invention, is the following.

The oscillator 7 supplies a very high frequency to the two coils 8a and 8b immersed in the solutions 12a and 12b respectively of the containers 6a and 6b, thus saturating the electronic resonance line of the TANO in each of these solutions.

The saturation of the electronic resonance line of one of the solutions generates (due to the coupling between electronic spins and nuclear spins in this solution) an increase of the absorption of energy at the nuclear resonance frequency of this solution, whereas the saturation of the electronic resonance line of the second solution causes (due to the coupling between electronic spins and nuclear spins in this second solution) a stimulated emission of energy at the nuclear resonance frequency of this second solution, which is the same as the nuclear frequency of the first solution, namely the resonance frequency of the hydrogen nucleus or proton of the solvent (DME, methanol or water) in the magnetic field in which the containers 6a and 6b are placed.

Between the coils 1a and 2a of the first pair and the coils 1b and 2b of the second pair, there is a coupling through the nuclear spins acting as described hereabove with reference to FIGURE 1. On the other hand, since the receiving coils 1a and 1b have their axes parallel but oriented in opposite directions, the E.M.F.'s induced in these coils by the external electromagnetic field and the displacements of the magnetometer are eliminated by compensation. As for the exciting coils 2a, 2b, they are mounted in series, their axes in the same direction as the axes of the coils 1a, 1b. The two coils 2a and 1a, on the one hand, and 2b and 1b on the other hand, are naturally decoupled, and the coefficients of coupling by mutual induction $m_a$ between the coils 2a and 1a and $m_b$ between the coils 2b and 1b are arranged to be opposite with $m_b = -m_a$. The cancellation of the E.M.F.'s induced at the terminals of the input 3 of the amplifier 5 is achieved by means of the potentiometer 13.

In order that the E.M.F.'s of nuclear origin, induced in the two receiving coils 1a, 1b, are added at the input terminals 3 of the amplifier 5, it is necessary (and sufficient) that the macroscopic resultants of the magnetic moments of all the atomic nuclei of the two samples are in phase opposition, for the two coils 1a and 1b are wound in opposite senses, and the couplings between the two coils 1a, 2a, on the one hand, and 1b, 2b, on the other hand, are imposed by construction.

The opposition of the two macroscopic components is achieved by using a pair of solutions 12a and 12b having the properties mentioned above, the saturation of the common electronic resonance line of the two solutions generating in the two solutions macroscopic components in opposite senses.

Thus, a frequency is finally obtained at the output of the linear amplifier 5 which is strictly proportional to the intensity of the magnetic field prevailing in the zone in which the two containers 6a and 6b are located. This frequency is measured by a frequency meter 10 of a known type, in particular a frequency meter appropriate for measuring a frequency of the order of 2100 cycles/second, in the case where the intensity of the terrestrial magnetic field is to be measured.

The pairs of solutions according to the invention have, with respect to the two pairs described in the patent mentioned above, whose disadvantages have also been mentioned (low polarization of TANOXIME, instability of DTBN and risk of freezing of the aqueous solutions), the following advantages.

DME can be prepared in the very pure state; in this state, it is very stable and does not attack TANO, in particular when it is exempt of water; it can thus be seen that it is preferable to use DME in the pure state as the solvent for the TANO.

Methanol is also a stable composition and does not attack TANO. The risk of freezing is very slight, in particular when methanol and DME in the pure state are used as solvents, the freezing temperature being about −58° C. for DME and about −95° C. for methanol.

The preferred pair of solutions, according to the invention, thus comprise TANO in pure DME to form the first solution and TANO in pure methanol to form the second solution.

Magnetic resonance magnetometers using this preferred pair can operate for several months, if not several years, in particular in an aircraft, without the need of changing the solutions having gyromagnetic properties. Such a magnetometer has the advantages of the magnetometer according to FIGURE 3 of the patent mentioned above namely:

Very precise measurement of weak magnetic fields, such as the terrestrial magnetic field;

Measurement insensitive to possible displacements and to external electromagnetic fields;

Existence of a single forbidden axis (if the magnetic field is directed along this axis, its measurement cannot be effected), namely the common direction of the four axes of the coils 1a–1b, 2a–2b; in an aircraft, this direction is chosen so that it coincides with the axis of the aircraft, or so that it is parallel to the axis of the aircraft.

The pairs of solutions according to the invention can be put into practice in various types of magnetometers other than that described in the patent mentioned above, in particular in a magnetometer of the type described in United States Patent application Ser. No. 659,451 filed in the name Antoine Salvi and Glenat on Aug. 9, 1967.

What I claim is:

1. In a magnetometer comprising:
   a first and a second container disposed side by side and each containing one solution of a pair of solutions having gyromagnetic properties, each solution comprising a paramagnetic substance, having at least one electronic resonance line saturable by high frequency radiation, dissolved in a solvent having a nuclear resonance frequency, the pair of solutions being such that the same high frequency excites two inverse electronic lines, such that the saturation of the resonance line of the paramagnetic substance of the first solution causes an increase of absorption of energy at the nuclear resonance frequency of this solution, whereas the saturation of the electronic resonance line of the second solution causes a stimulated emission of energy at the nuclear resonance frequency of this second solution, the nuclear resonance frequency of the second solution being the same as the nuclear resonance frequency of the first solution;
   means for saturating the common electronic resonance line of the two solutions in the two containers;
   a linear amplifier;
   two pairs of coils parallel with one another, the first pair being coupled to the first solution and the second pair to the second solution, with the first coil of the first pair and the first coil of the second pair connected to the input of said linear amplifier, and the second coil of the first pair and the second coil of the second pair are connected to the output of said amplifier;
   and a frequency meter connected to the output of the amplifier to measure the output frequency of said amplifier which is proportional to the intensity of the magnetic field in which the two containers are placed;
   the improvement wherein the pair of solutions having gyromagnetic properties comprises triacetoneamine nitroxide in two different solutions, the two solutions of triacetoneamine having a common electronic resonance line, the saturation of this common electronic resonance line producing in one of the solutions an absorption of energy and in the other solution a stimulated emission of energy at the common nuclear resonance frequency of the solution.

2. In a magnetometer according to claim 1, the improvement wherein the solvent of one of said two solutions is pure dimethoxyethane and the solvent of the other of said two solutions is pure methanol.

References Cited

UNITED STATES PATENTS 3,441,838   4/1969   Salvi _____ 324—0.5

RUDOLPH V. ROLINEC, Primary Examiner
MICHAEL J. LYNCH, Assistant Examiner

UNITED STATES PATENT OFFICE
CERTIFICATE OF CORRECTION

Patent No. 3,495,163         Dated February 10, 1970

Inventor(s) Antoine Salvi

It is certified that error appears in the above-identified patent and that said Letters Patent are hereby corrected as shown below:

In the heading, Column 1, the claimed priority date reading "March 7, 1967" should read -- March 9, 1967 --.

SIGNED AND
SEALED
JUN 30 1970

(SEAL)
Attest:

Edward M. Fletcher, Jr.
Attesting Officer

WILLIAM E. SCHUYLER, JR.
Commissioner of Patents